United States Patent
Driscoll

(10) Patent No.: US 9,213,530 B2
(45) Date of Patent: Dec. 15, 2015

(54) RUNTIME MEMORY THROTTLING

(71) Applicant: Oracle International Corporation, Redwood Shores, CA (US)

(72) Inventor: James George Driscoll, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 14/087,446

(22) Filed: Nov. 22, 2013

(65) Prior Publication Data

US 2015/0052506 A1    Feb. 19, 2015

Related U.S. Application Data

(60) Provisional application No. 61/866,223, filed on Aug. 15, 2013.

(51) Int. Cl.
*G06F 9/44* (2006.01)
*G06F 9/45* (2006.01)
*G06F 9/455* (2006.01)

(52) U.S. Cl.
CPC .. *G06F 8/42* (2013.01); *G06F 8/47* (2013.01); *G06F 9/4552* (2013.01); *G06F 2209/504* (2013.01)

(58) Field of Classification Search
None
See application file for complete search history.

(56) References Cited

U.S. PATENT DOCUMENTS

| | | | |
|---|---|---|---|
| 6,516,416 | B2 | 2/2003 | Gregg et al. |
| 7,290,288 | B2 | 10/2007 | Gregg et al. |
| 7,971,010 | B2 | 6/2011 | Schmelter et al. |
| 2011/0029822 | A1 | 2/2011 | Moser |
| 2013/0086424 | A1 | 4/2013 | Smiljanic et al. |
| 2013/0086625 | A1 | 4/2013 | Driscoll |
| 2014/0282384 | A1* | 9/2014 | Pamer .......................... 717/113 |

OTHER PUBLICATIONS

C. Champeau; "Customizing Groovy Compilation Process"; Cedric Champeau's Weblog; May 12, 2011; [retrieved on May 1, 2012]; 5 pages. Retrieved from: http://jroller.com/melix/entry/customizing_groovy_compilation_process.
D. McDonald; "Oracle Service Bus—Using WLST to Secure Proxy Services"; XP-002729012; Ohoes-nz.blogspot; Apr. 19, 2013; https://web.archive.org/web/20130419033604/http://ohnoes-nz.blogspot.com.
"Local AST Transformations"; Groovy; XP-002729013; Feb. 7, 2013; https://web.archive.org/web/20130702191935/http://groovy.codehaus.org/Local+AST+Transformations.

\* cited by examiner

*Primary Examiner* — Chuck Kendall
(74) *Attorney, Agent, or Firm* — Miles & Stockbridge, P.C.

(57) ABSTRACT

A system that implements a memory management policy at runtime when receiving a syntax tree in response to initiating the compiling of software code identifies a plurality of calls within the syntax tree and modifies each the plurality of calls with a corresponding memory-modified call to create a plurality of memory-modified calls. Each memory-modified call is linked with a memory management class and the modifying occurs during the compiling of the software code. Following modification of each of the plurality of calls, the system compiles the plurality of memory-modified calls to generate a bytecode.

21 Claims, 4 Drawing Sheets

RUNTIME MEMORY THROTTLING

CROSS REFERENCE TO RELATED APPLICATIONS

This application claims priority of Provisional Patent Application Ser. No. 61/866,223, filed on Aug. 15, 2013, the contents of which is hereby incorporated by reference.

FIELD

One embodiment is directed generally to a computer system, and in particular to a computer system that compiles software instructions.

BACKGROUND INFORMATION

For all types of computer systems, memory can be a limited resource. No matter how fast computing systems become, there is always a dependence on a finite amount of memory in which to run software applications. As a result, software developers typically consider available memory resource when writing and developing software applications.

The JAVA programming language presents several features that appeal to developers of large-scale distributed systems, such as write once, run anywhere portability, portable support for multithreaded programming, and support for distributed programming, including remote method invocation and garbage collection. However, JAVA differs from many traditional programming languages in the way in which memory is allocated and de-allocated. Many programming languages, such as C and C++, explicitly allow for the allocation and de-allocation of memory by the application programmer/developer. In contrast, JAVA virtual machines ("VM"s) manage memory via structures which are deliberately opaque to programmers of JAVA applications. This opacity is problematic when running scripts in a shared user environment, such as a server VM, as one thread running out of memory has the potential of corrupting other running threads. This cross-thread contamination can cause the entire JAVA VM to be shut down.

SUMMARY

One embodiment is a system that implements a memory management policy at runtime when receiving a syntax tree in response to initiating the compiling of software code. The system identifies a plurality of calls within the syntax tree and modifies each the plurality of calls with a corresponding memory-modified call to create a plurality of memory-modified calls. Each memory-modified call is linked with a memory management class and the modifying occurs during the compiling of the software code. Following modification of each of the plurality of calls, the system compiles the plurality of memory-modified calls to generate a bytecode.

DETAILED DESCRIPTION

One embodiment, while compiling a program in memory, intercepts all calls that create a new object and determines, based on a memory policy, whether the new object can be created in view of JAVA VM memory considerations/restrictions. If the creation of the new object does not negatively impact memory, the object can be created. By blocking the inadvertent run-away creation of in-memory objects, embodiments significantly enhance the stability and performance of systems which allow an end user to enter scripts to be run on multi-user servers.

Figure 1:
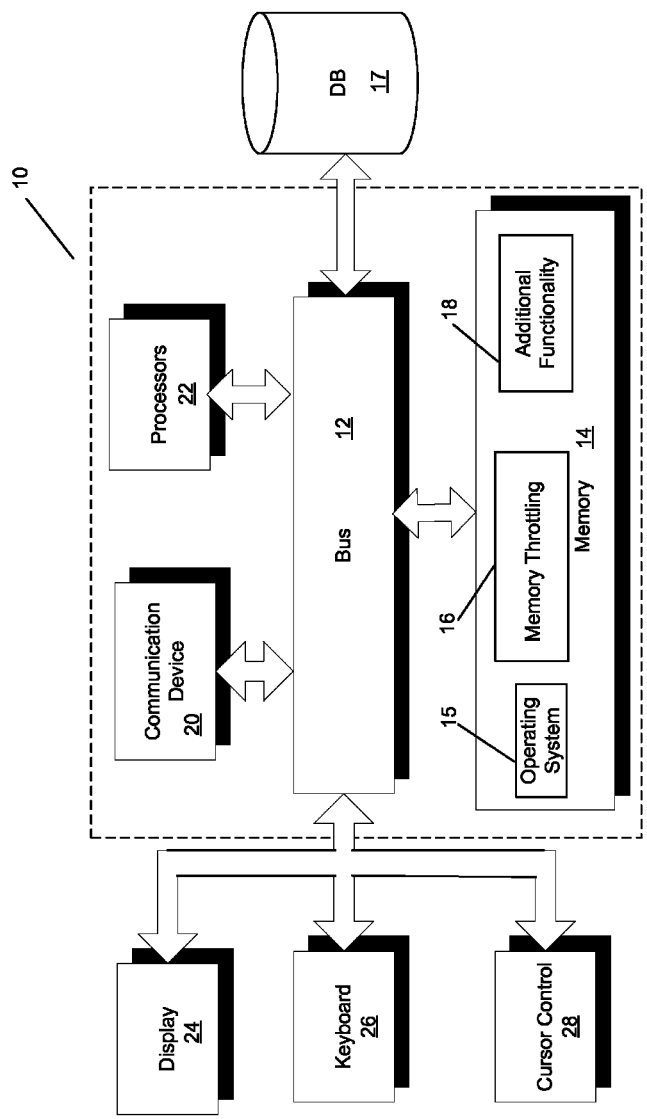
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a memory throttling module 16 for throttling memory at runtime, and all other functionality disclosed herein. System 10 can be part of a larger system. Therefore, system 10 can include one or more additional functional modules 18 to include the additional functionality, such as additional GROOVY or JAVA related functionality. A database 17 is coupled to bus 12 to provide centralized storage for modules 16 and 18.

One embodiment uses a programming language that allows for modification of the syntax tree during the compilation process, and implements one or more memory throttling rules (referred to herein as a "memory policy"). As an example, a user may submit code to a server from a remote computer system for compilation and execution. This server may be operated by a third-party that is distinct from the user, and the third-party may desire to enforce a memory policy that prevents certain actions from being performed by the user's code. While the code submitted by the user (either remote or local to the server) may not contain memory policy functions, the server may modify method calls in a syntax tree based on the code supplied by the user. Once the syntax tree has been created based on the code, an analysis of the syntax tree may be performed. The analysis can identify various methods, constructor access, and/or property access that are strictly prohibited in accordance with the memory policy. These violations of the memory policy may prevent the code from being compiled into bytecode and may result in an exception being output. An indication of the exception can be provided to the user.

In one embodiment, the programming language is the "GROOVY" programming language, or some other programming language that permits access to the syntax tree during the compiling process before bytecode (or machine code) has been generated. GROOVY is an object-oriented programming language for the JAVA platform. Generally, GROOVY is a superset of JAVA and therefore JAVA code may likely be syntactically valid in GROOVY. GROOVY includes additional syntax and features in addition to what is available in JAVA. Similar to JAVA, GROOVY code can be compiled into bytecode. This bytecode can be translated by a virtual machine ("VM") into machine code.

When GROOVY code is being compiled, prior to the bytecode being generated, an abstract syntax tree ("AST") is created based on the code. While in the form of a syntax tree, embodiments edit the AST before the bytecode is created. Therefore, various modifications can be made to the AST that will affect creation of the bytecode and how the bytecode will execute at runtime. Instead of using GROOVY, other embodiments can use any programming language that allows for editing of code at the syntax tree level prior to being compiling into bytecode (or machine code).

In general, embodiments that use GROOVY includes the following functionality: (1) An annotation, placed on GROOVY code (either automatically or manually); (2) an AST manipulation class, which does rewriting of method and property access; and (3) an optional Quota Policy class, which enforces the memory constraints at runtime. All three parts can have multiple, overlapping implementations to allow for differences in usage (for instance, embedded vs. standalone use).

The annotation in one embodiment is a standard GROOVY AST annotation. It is used to notify the GROOVY compiler (either called via the command line, or via GroovyShell.parse( )) that the GROOVY AST manipulation class should be called. For instance, one type of annotation could be used for GROOVY Script code, while another could be used for GROOVY Class code.

The Groovy AST manipulation intercepts all loop code, and wraps it with new code, which is responsible for determining if the loop has exceeded some allowed memory quota (i.e., the memory policy). Similarly, all collection classes and Strings are monitored for size, and additional checks may be added to count the number of memory intensive objects created, again subject to a quota. Additional checks may be added as well, for other operations which may consume undue amounts of system resources, such as combinations of otherwise innocuous objects. Once the AST manipulation is complete, the class can be accessed with some assurance against memory exhaustion in the same manner as any other class in the Java VM.

Quotas may be determined by system-wide specified properties, by the use of a Quota Policy class, by metadata associated with the script, by variables placed into the script by the end user, or by some other method or combination of methods.

Figure 2:
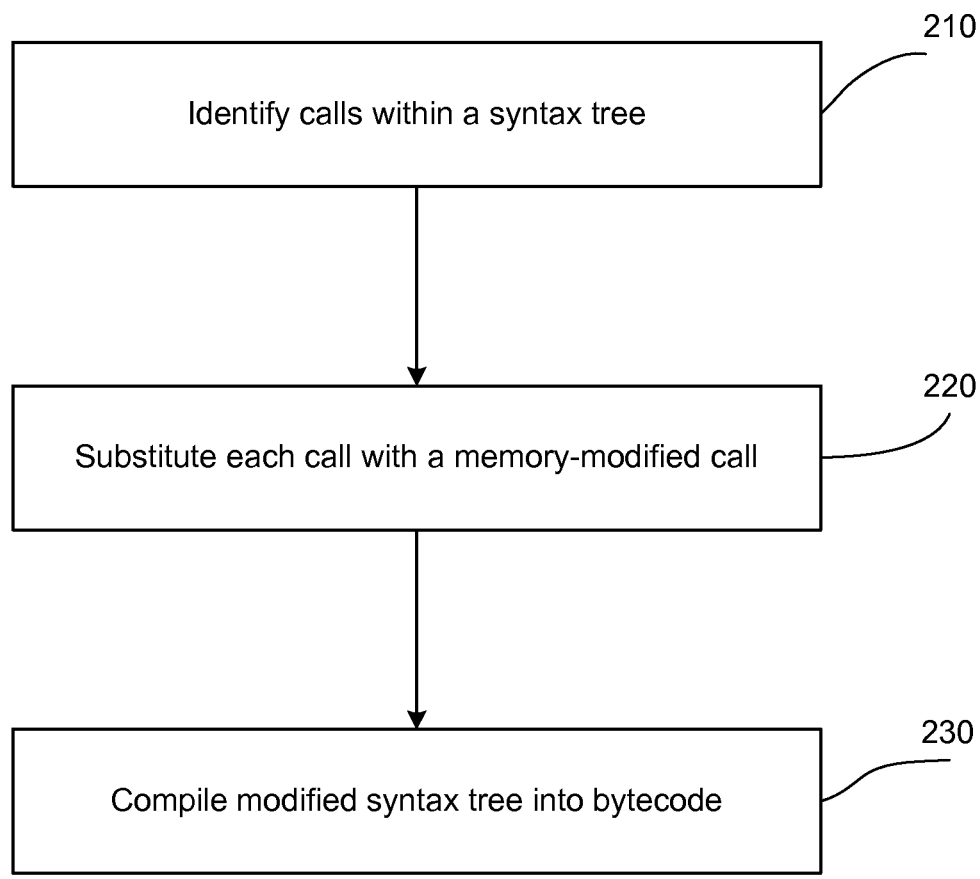
FIG. 2 is a flow diagram of the functionality of the memory throttling module of FIG. 1 when throttling memory at runtime in accordance with one embodiment.

FIG. 2 is a flow diagram of the functionality of memory throttling module 16 of FIG. 1 when throttling memory at runtime in accordance with one embodiment. In one embodiment, the functionality of the flow diagram of FIG. 2, and FIGS. 3 and 4 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 210, calls within a syntax tree are identified. The syntax tree may be an abstract syntax tree that was created based on code written or otherwise provided by a user. The syntax tree may be created as part of the process of compiling the code. In some programming languages it is possible to edit code after the syntax tree has been generated. For example, compiling GROOVY code may allow for modification of code after a syntax tree has been generated but before bytecode has been generated. The user may have added one or more annotations to the code that indicate that one or more syntax tree manipulation classes should be called. In addition to identifying method calls, constructor calls and/or property access calls may be identified. Identification of method calls, constructor calls, and/or property access calls ("calls") may be accomplished by parsing the syntax tree.

At 220, for each method call identified, a memory-modified call is substituted. In addition to being for method calls, constructor calls and/or property access calls may also be substituted with memory-modified calls. A memory-modified call causes a check for permission of the call based on a memory policy, as disclosed in detail below. Substituting a memory-modified call for a call may involve associating the call with a memory class such that the memory class is evaluated to determine whether permission is granted prior to the call being executed. For example, substituting a method call with a memory-modified method call may involve the method call being wrapped in a memory class call or otherwise modified so that the method call is checked against a memory policy. The method call may become a parameter of the memory class, thus creating a memory-modified method call. The method call may only be executed if the memory check results in the method call being identified as permissible. As such, the memory class that is based on a memory policy will be checked for permission to perform the method call before the method call has been performed. Similar association and/or wrapping may occur for constructor calls and/or property access calls.

At 230, following substitution, the syntax tree, which now may contain one or more memory-modified method calls, memory-modified constructor calls, and/or memory-modified property access calls ("memory-modified calls"), is compiled. The compilation of the modified syntax tree results in the creation of bytecode configured to be interpreted into machine code for execution. When executed, each memory-modified call is checked against the memory policy using the memory class. If a memory-modified call fails to pass the memory policy, the bytecode is ceased being executed and an exception is generated. The exception can be stored and/or output to a user. In some embodiments, it may be possible to skip the offending memory-modified call and attempt to continue executing the bytecode.

Figure 3:
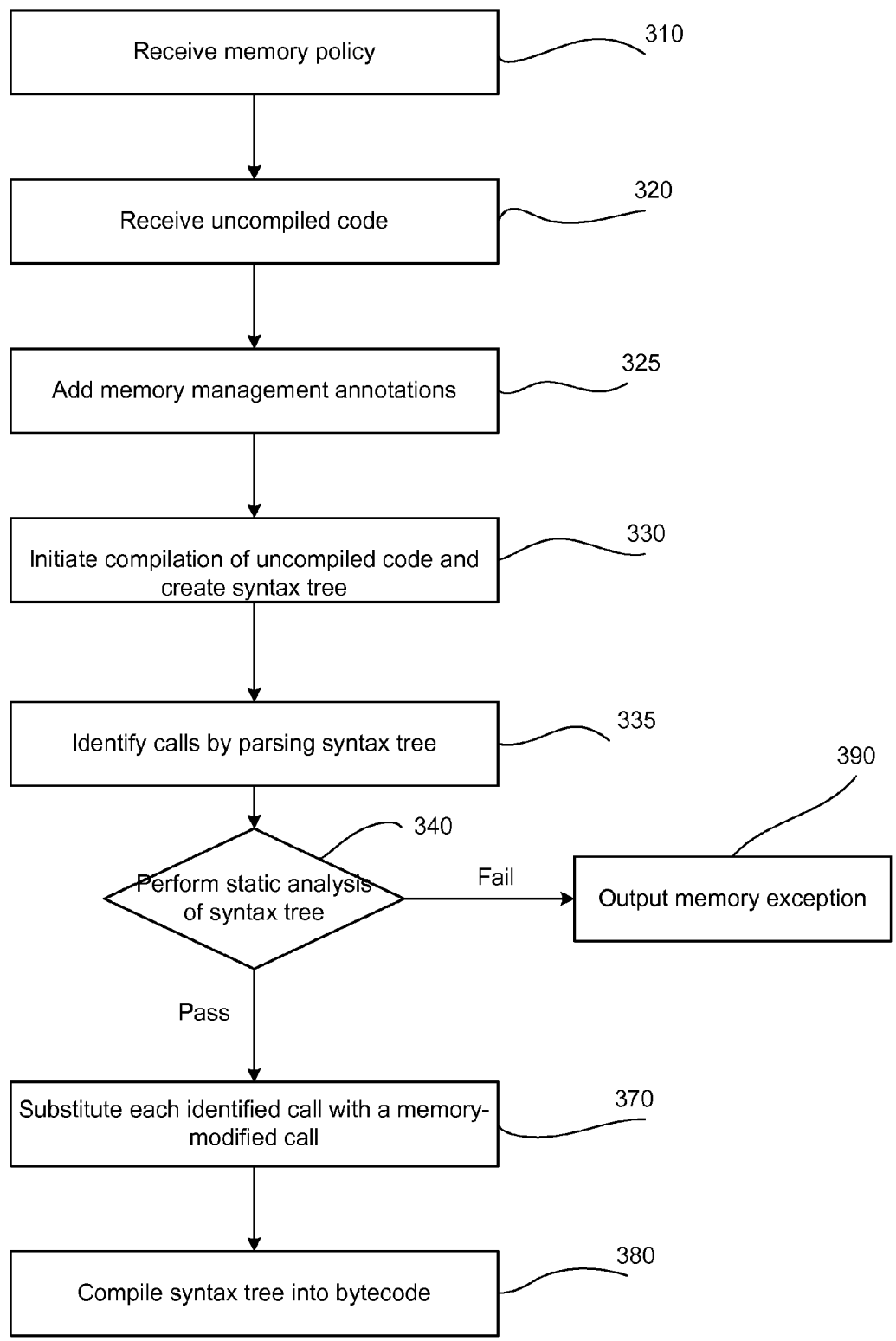
FIG. 3 is a flow diagram of the functionality of the memory throttling module of FIG. 1 when throttling memory at runtime in accordance with another embodiment.

FIG. 3 is a flow diagram of the functionality of memory throttling module 16 of FIG. 1 when throttling memory at runtime in accordance with another embodiment.

At 310, a memory policy is received. The memory policy can include one or more memory rules that identify a type of method call, constructor call, and/or property access call that may not be allowed during execution of compiled code, due to excessive memory usage, and may be detected during static analysis. The memory policy may be a default memory policy provided by or to the entity that is compiling code and/or may be a customized memory policy. The memory policy in one embodiment uses knowledge of the size of the existing memory array in the JAVA VM or its libraries, and determines whether the size can be made larger, or limits all new object creation to a single array. The restrictions of memory size can be dynamically tuned and changed.

The memory policy in one embodiment is stored by the system that is compiling code for execution. In some embodiments, the memory policy may be stored remotely but may be accessible to the system that is compiling code for execution.

At 320, uncompiled code is received. This code may be received in the form of a user writing code or providing one or more files containing code. In some embodiments, a user, via a user computer system, may submit code through a web-based interface to a remote server to be compiled and executed. The remote server may receive the uncompiled code, compile it, and execute the code remote from the user computer system. Code may be received from other sources besides a remote user computer system.

At 325, one or more memory management annotations are added to the uncompiled code. The memory management annotations serve as an indication to the compiler that a manipulation class (such as a GROOVY AST manipulation class) should be called. An annotation for script code (e.g., GROOVY script code) and/or an annotation for class code (e.g. GROOVY class code) can be added. Such memory management annotations can be added manually by a user or automatically. In embodiments that use GROOVY, the memory management annotations may be added as either global or local transformations, and may be triggered at the compilation step, which may be from the command line, or from a GROOVY application programming interface ("API") such as GroovyShell.parse( ). In some embodiments, instead of an annotation, some other triggering mechanism can be used, such as a configuration switch, a properties file, or an environment variable.

At 330, the compilation of the code is initiated, which causes an abstract syntax tree to be created based on the uncompiled code received at 320. The AST is a tree representation of the uncompiled code received at 320 written in a programming language, such as GROOVY. Each node of the AST corresponds to an element in the uncompiled code in one embodiment. The programming language used for some embodiments, such as GROOVY, permits editing of the syntax tree prior to the syntax tree being used to compile bytecode (or machine code).

At 335, calls within the syntax tree created at 330 are identified by parsing the syntax tree. This may include method calls, constructor calls, and/or property access calls.

At 340, the memory policy received at 310 is used to perform a static analysis of the syntax tree. Static analysis identifies one or more constructor calls, method calls, and/or property access calls that will violate the memory policy (i.e., are not permitted under the memory policy). For example, when reading an Extensible Markup Language ("XML") file known to be large, using Document Object Model ("DOM") methods which hold the entire document in memory could result in disallowing the script to compile. As another example, creating an array of very large static String objects could also result in disallowing the script to compile, as could reading those Strings from a file or database where they are known to be large.

If one or more constructor calls, method calls, and/or property access calls fail to be permissible in accordance with the memory policy, the functionality continues to 390.

At 390, a memory exception is generated and output based on the one or more failed calls at 340. In one embodiment, if the uncompiled code received at 320 was received from a user via a web interface, the web interface can be used to provide the user with an indication of the one or more failed calls. Compiling of the syntax tree into bytecode may be blocked, at least until the memory exceptions are corrected in the uncompiled code.

If the static analysis at 340 does not identify any memory exceptions in accordance with the memory policy, the functionality continues to 370. At 370, for each method call identified at 335, a memory-modified method call is substituted by modifying method calls, constructor calls and/or property access calls. Substituting a memory-modified method call for a method call includes associating the method call with a memory class such that the memory class is evaluated to determine if the method call is permitted to be executed. The method call may only be executed if the memory check results in the method call being identified as permissible. Substituting a method call with a memory-modified method call may involve the method call being wrapped in a memory class call. As such, the memory class is used to check for permission to perform the method call before the method call has been performed. Similar association and/or wrapping may occur for constructor calls and/or property access calls. In some embodiments, the functionality of 335 and 370 are performed together as a syntax tree is parsed. For example, a first method call may be identified and substituted with a memory-modified method call before a second method call is identified.

At 380, following substitution being completed at 370, the syntax tree, which now contains one or more memory-modified method calls, memory-modified constructor calls, and/or memory-modified property access calls, is compiled. The compilation of the modified syntax tree results in bytecode configured to be interpreted by a virtual machine into machine code for execution. In some embodiments, machine code may be created directly by the compiler.

Figure 4:
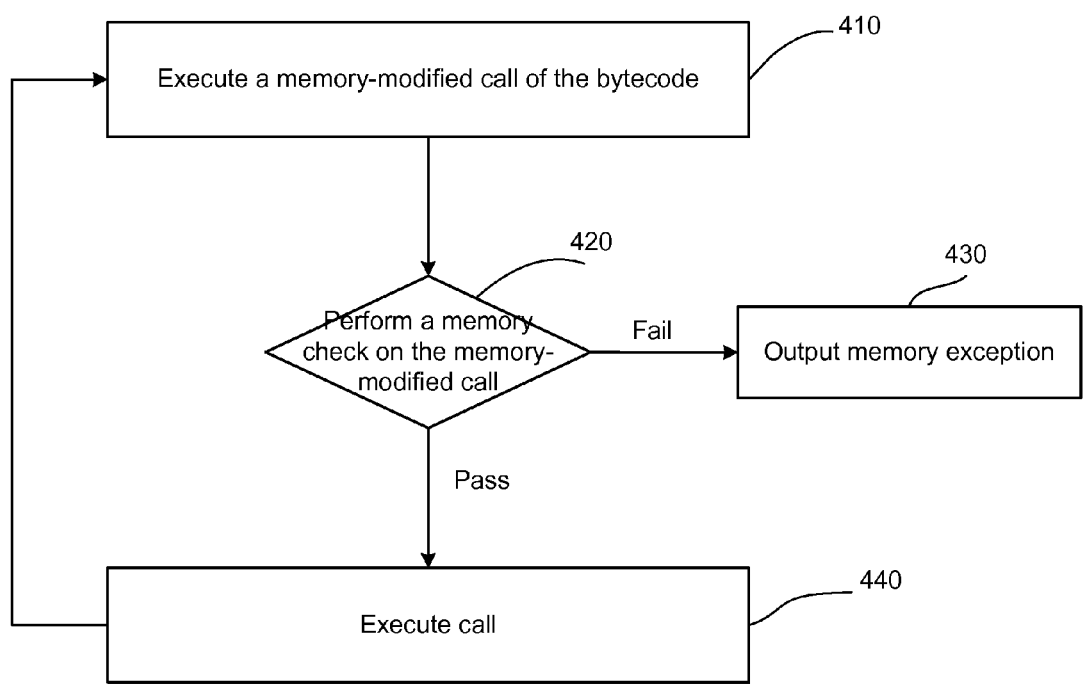
FIG. 4 is a flow diagram of the functionality of the memory throttling module of FIG. 1 for executing bytecode created using a syntax tree that was modified during compilation in accordance with another embodiment.

FIG. 4 is a flow diagram of the functionality of memory throttling module 16 of FIG. 1 for executing bytecode created using a syntax tree that was modified during compilation in accordance with another embodiment. The bytecode could have been created using the functionality of FIG. 3. The functionality of FIG. 4 may also be executed by a system separate from system 10 of FIG. 1.

At 410, a first memory-modified call of the bytecode is attempted to be executed. The call can be a memory-modified method call, a memory-modified constructor access call or a memory-modified property access call. When executed, rather than directly executing the call, a memory class associated with the call may be used.

At 420, the memory check for the memory-modified call is performed based on the memory policy and existing quotas. If the call fails to pass the memory policy, the functionality continues at 430. At 430, a memory exception is generated and output. The bytecode may be prevented from being executed further, and the user is notified of the exception.

If the call satisfies the memory policy at 420, at 440, the call is executed. Therefore, if a first call was used to create a memory-modified call at 370 of FIG. 3, the first call will be executed at 440 if the method call is in accordance with the memory policy. Following successful execution of 440, functionality continues to 410 when another memory-modified call is executed. This will continue until the bytecode has completely been executed.

As disclosed, embodiments intercept compilation calls and either allows the call or disallows the call based on the memory policy during compilation. By blocking the inadvertent run-away creation of in-memory objects, embodiments can significantly enhance the stability and performance of systems which allow the end user to enter scripts to be run on multi-user servers, such as GROOVY with a JAVA VM. Since embodiments do not rely on changes to the JAVA VM, it can be used with currently implemented JAVA VMs.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to implement a memory management policy at runtime, the implementation comprising:
   receiving a syntax tree in response to initiating a compiling of software code;
   identifying a plurality of calls within the syntax tree;
   modifying each of the plurality of calls with a corresponding memory-modified call to create a plurality of memory-modified calls, wherein each memory-modified call is linked with a memory management class and the modifying occurs during the compiling of the software code based on a memory policy that comprises a quota of allowed memory; and
   following modification of each of the plurality of calls, compiling the plurality of memory-modified calls to generate a bytecode.

2. The computer-readable medium of claim 1, the compiling the plurality of memory-modified calls comprising:
   execute a memory-modified call;
   determine if the memory-modified call satisfies the memory policy;
   when the memory-modified call fails to satisfy the memory policy, generate a memory exception.

3. The computer-readable medium of claim 2, the implementation further comprising:
   when the memory-modified call fails to satisfy the memory policy, halting the generation of the bytecode.

4. The computer-readable medium of claim 1, wherein the modifying comprises adding one or more annotations to uncompiled software code, the annotation indicating that a manipulation class should be called.

5. The computer-readable medium of claim 1, wherein the uncompiled code is written as a GROOVY language.

6. The computer-readable medium of claim 1, wherein the bytecode is translated by a JAVA virtual machine into machine code.

7. The computer-readable medium of claim 2, wherein the memory policy is based on JAVA memory constraints.

8. The computer-readable medium of claim 1, wherein the software code is received from a remote party.

9. A method of implementing a memory management policy at runtime, the method comprising:
   receiving a syntax tree in response to initiating a compiling of software code;
   identifying a plurality of calls within the syntax tree;
   modifying each of the plurality of calls with a corresponding memory-modified call to create a plurality of memory-modified calls, wherein each memory-modified call is linked with a memory management class and the modifying occurs during the compiling of the software code based on a memory policy that comprises a quota of allowed memory; and
   following modification of each of the plurality of calls, compiling the plurality of memory-modified calls to generate a bytecode.

10. The method of claim 9, the compiling the plurality of memory-modified calls comprising:
    execute a memory-modified call;
    determine if the memory-modified call satisfies the memory policy;
    when the memory-modified call fails to satisfy the memory policy, generate a memory exception.

11. The method of claim 10, the implementation further comprising:
    when the memory-modified call fails to satisfy the memory policy, halting generation of the bytecode.

12. The method of claim 9, wherein the modifying comprises adding one or more annotations to uncompiled software code, the annotation indicating that a manipulation class should be called.

13. The method of claim 9, wherein the uncompiled code is written as a GROOVY language.

14. The method of claim 9, wherein the bytecode is translated by a JAVA virtual machine into machine code.

15. The method of claim 10, wherein the memory policy is based on JAVA memory constraints.

16. A software compiler comprising:
    a processor;
    a memory device coupled to the processor and storing instructions that generate modules when executed by the processor, the modules comprising:
    an identification module that receives a syntax tree in response to initiating a compiling of software code and identifies a plurality of calls within the syntax tree; and
    a modification module that modifies each of the plurality of calls with a corresponding memory-modified call to create a plurality of memory-modified calls, wherein each memory-modified call is linked with a memory management class and the modifying occurs during the compiling of the software code based on a memory policy that comprises a quota of allowed memory; and
    a compiler module that, following modification of each of the plurality of calls, compiles the plurality of memory-modified calls to generate a bytecode.

17. The software compiler of claim 16, the compiling the plurality of memory-modified calls comprising:
    execute a memory-modified call;
    determine if the memory-modified call satisfies the memory policy;
    when the memory-modified call fails to satisfy the memory policy, generate a memory exception.

18. The software compiler of claim 17, the compiling further comprising:
    when the memory-modified call fails to satisfy the memory policy, halting the generation of the bytecode.

19. The software compiler of claim 16, wherein the modifying comprises adding one or more annotations to uncompiled software code, the annotation indicating that a manipulation class should be called.

20. The software compiler of claim 16, wherein the uncompiled code is written as a GROOVY language.

21. The software compiler of claim 16, wherein the bytecode is translated by a JAVA virtual machine into machine code.

\* \* \* \* \*